June 23, 1964  R. S. WASHBURN  3,138,023
LEVEL INDICATOR AND CONTROL
Filed June 29, 1960
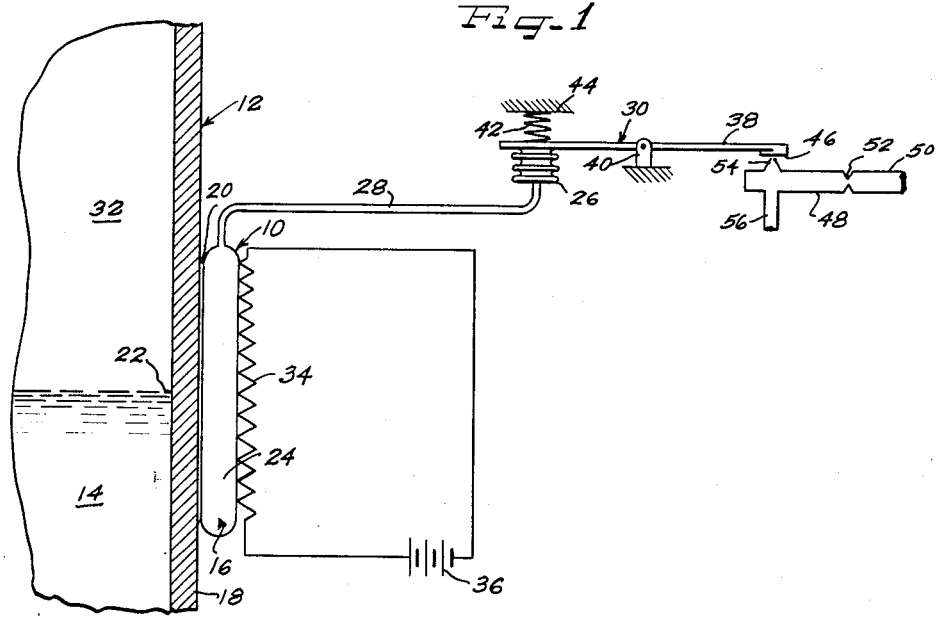
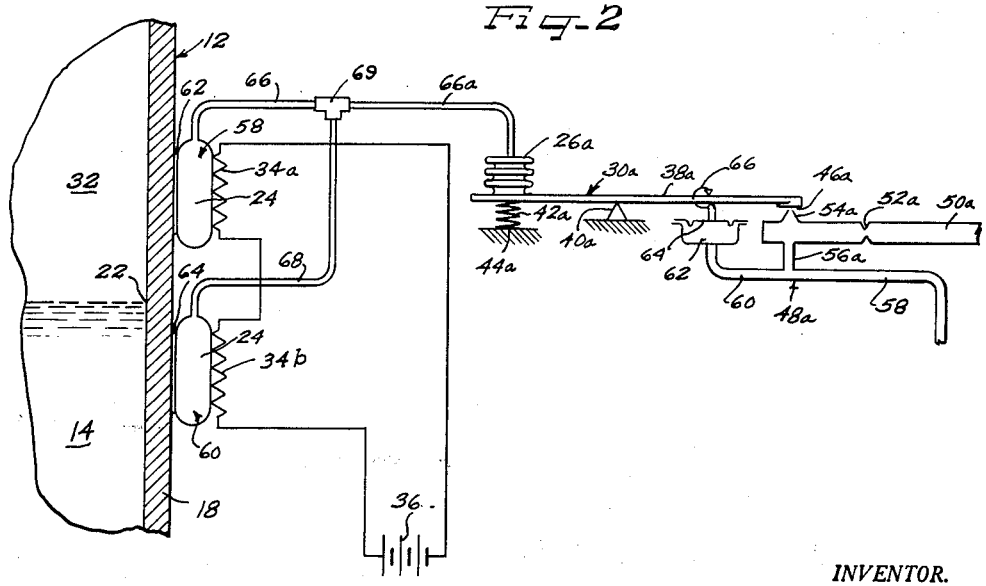
INVENTOR.
Robert S. Washburn
BY
ATTORNEYS 3,138,023
LEVEL INDICATOR AND CONTROL
Robert S. Washburn, Beloit, Wis., assignor to Beloit
Corporation, a corporation of Wisconsin
Filed June 29, 1960, Ser. No. 39,565
3 Claims. (Cl. 73—295)

This invention relates to a level indicator and control and more particularly to a device for determining and controlling the liquid level in a vessel in accordance with a pressure condition in cell means on a wall of the vessel which is determined by heat loss or gain.

Heretofore, a great variety of level indicator and control means have been available, some of which have given a visual indication of level in a vessel by using heated devices at different levels in the vessel. However, such devices generally have required the use of relatively complex electrical systems, as well as special auxiliary constructions for introducing fluid from the vessel into operative relation with heated devices.

The present invention provides an unusually simple means for determining and controlling the liquid level in a pressure vessel, or the like, which includes a sealed capsule or cell which is sensitive to heat loss or gain and is mounted at a position on the wall of the vessel such as to extend above and below the desired liquid level in the vessel. Since the liquid will have a greater heat conductivity and capacity than the gas above it, a differential heat loss or gain will be imparted to the cell at the respective portions above and below the liquid level. Fluids such as are commonly used in refrigerant systems may be contained in the cell so as to provide a pressure therein dependent on the liquid level, carbon dioxide, sulphur dioxide, "Freon" (a trademark of E. I. du Pont de Nemours & Co.), designating fluorochloromethanes and ethanes and methane being exemplary of suitable fluids or gases, although other fluids such as water could be used in accordance with the invention. In one embodiment of the invention, a pair of cells above and below the liquid level respectively may be utilized, and a bellows means is connected by conduit means to the cell or cells to impart a level indicating signal to a signal device as determined by the pressure in the cell or cells. Heating or refrigerating means are disposed in heat exchange relation with the cell means to provide a differential between the temperature in the cell means and the temperature of the vessel, for increased accuracy of response.

In the embodiment where a pair of cells are utilized, the individual cells may be disposed in laterally displaced relationship around the vessel as desired without interfering with the indicating and control functions thereof, and these cells, or the single cell structure, may be calibrated to accommodate variations in conditions within the vessel and in the conductivity and thickness in the wall of the vessel, as for example by utilizing a relatively large cell volume to compensate for any splashing which may occur within the vessel and to eliminate "hunting" from transient variations in level.

The bellows means may actuate an instrument beam pivotally mounted to control the escape of a gas such as air from a source of uniform pressure, thus to produce a signal pressure which may be used either to indicate the increased level or to control corrective action. It will be understood, however, that other signal means may be operated by the beam, or by the bellows, in accordance with the invention. Calibrated spring means are provided to control the action of the bellows which preferably bear on a side of the beam opposite the bellows. Where the instrument output is used to control corrective action, this action may be a change in the head pressure of gas in the vessel, in the rate of liquid removal or in the rate of liquid supply according to specific operating conditions. Thus where an increase in liquid level within the vessel has occurred, an increased heat flow from the cell or capsule will be produced, and a net increase in heat flow where two cells are used. This in turn results in a net decrease in the gas pressure in the cell means and in the bellows. A decrease in liquid level would result in a decrease in heat flow from the cell means (and from the lower cell where two cells are used) so as to produce a corresponding increase in the gas pressure. This operation, of course, assumes a heated condition for the cell means relative to the liquid in the vessel, and the operation would be reversed if the cell means were cooled relative to the liquid.

Accordingly, it is an object of the present invention to provide a liquid level indicator and control device actuated by self-contained cell means on an upstanding wall of the vessel whose liquid level is to be determined, without the need for complicated support mechanism for the cell means.

Another object of the invention is to provide a device as described which eliminates the need for the complex electrical means on the vessel.

Yet another object of the invention is to provide a device as described which is effective in a variety of applications and does not require special techniques or skills and which can operate without constant adjustment or repair.

Other objects and advantages of the invention will become apparent as the description proceeds in accordance with the drawings in which:

FIGURE 1 is a schematic view of a level indicator and control according to the invention in operative relationship with a pressure vessel in fragmentary vertical cross section; and FIGURE 2 is a schematic view of a second embodiment of a level indicator and control in accordance with the invention, and in operative relationship with a pressure vessel in fragmentary vertical cross section, the control including feed back means which may be used with either of the embodiments.

Referring now to the drawings, and to FIGURE 1 in particular, a level indicator and control 10 is shown in accordance with the present invention in operative relationship to a pressure vessel 12 which is filled with a liquid 14 whose level is to be determined. The device 10 includes an elongate capsule or gas cell 16 which is shown as being secured on the exterior surface of a heat conductive wall 18 as by welding or other suitable adhesive material 20 and in heat exchange relationship therewith. The cell 16 extends upwardly and downwardly from a desired water level 22 and contains a supply of heat vaporizable fluid such as carbon dioxide, sulphur dioxide, Freon or methane such as is commonly used in refrigerant systems, although other heat vaporizable fluids, even including water, may also be used. This fluid is designated by reference numeral 24, and is effective to operate a bellows 26 through conduit means 28 communicating with the bellows and the cell 16, preferably at the upper end of the cell 16. The bellows 26 forms part of a control unit 30 which may be used to provide a signal by which an operator can correct the liquid level in the tank 12, or to actuate a liquid level control mechanism directly, in accordance with the understanding of those skilled in the art and as hereinafter further described.

The liquid 14 has greater heat conductivity and capacity than the gas or atmosphere 32 thereabove and where the liquid is relatively cooler than the fluid 24 in the cell 16, it will afford a flow of heat from the portion of the cell in register therewith which is greater than the flow of heat from the portion of the cell in register with the gas or atmosphere 32 in the vessel. Accordingly, an increase in liquid level within the vessel will result in an increase of heat flow from the cell or capsule 16. This increase of heat flow will in turn result in a decrease in the gas pressure within the capsule. Conversely, a decrease in liquid level will result in a decrease in heat flow from the capsule or cell 16 and will in turn cause a corresponding increase in gas pressure therein. In order to provide a pressure response which accurately reflects the liquid level in the vessel, means are provided to maintain a temperature for the gas 24 which is different from the temperature in the vessel 12 or its wall 18 so as to augment the heat exchange relationship therewith. Such means may be either heating or refrigerating means, depending upon the specific conditions of use, and are herein represented by a resistance element 34 in heat exchange relationship with the cell or capsule 16 and connected to a convenient source of electrical energy 36 such as a 110 volt power supply.

The control unit 30 responds to expansion or contraction of the bellows 26 as effected by increase or decrease in the pressure in the cell 16, and to this end, the bellows 26, which may be of stainless steel or other suitable construction, is sealed to a beam or lever 38 pivoted on a fulcrum 40 intermediate its ends. Preferably, the action of the beam 38 is controlled by a calibrated spring 42 which may be located on the opposite side of the beam from the bellows 26 and may urge the beam in the direction of the bellows as supported by a bracket or the like 44. It will be understood, however, that variations in this construction will be encompassed within the scope of the invention, as for example, the spring may be located on the other side of the beam, on the other side of the fulcrum 40 from the bellows, or otherwise arranged to apply controlling force to meet particular conditions.

The end of the beam 38 opposite the bellows 26 may have a valve element 46 formed thereon, although it will be understood that the beam itself may act as an indicating member. Thus the valve element 46 may control a pneumatic signal means 48, in accordance with its angular position relative to the fulcrum 40 as controlled by the bellows 26. The pneumatic means 48 may include a conduit 50 leading to a source of uniformly pressurized fluid such as air, and may lead through a restricted opening 52 to a pressure outlet nozzle 54 controlled by the valve element 46. An outlet line 56 leads from the supply conduit 50 at a point such that the pressure therein is controlled by the valve element 46 in conjunction with the nozzle 54. Thus when the liquid in the vessel 12 has fallen below the cell 16 so that the cell is entirely in heat exchange relationship with the gas or vapor 32, the control system 30 may provide for closing the nozzle 54, by means of the valve element 46, so that, for example, the pressure in the conduit 56 may be substantially 15 p.s.i.; whereas when the liquid 14 is at the desired level as shown, the pressure in the conduit 56 may be substantially 8 to 9 p.s.i., i.e., where a predetermined range of from 3 p.s.i. to 15 p.s.i. is afforded. Such figures are, of course, exemplary only.

Referring now to FIGURE 2, a second embodiment of the invention is shown wherein upper and lower cells 58 and 60 are secured in heat exchange relationship with the wall 18 of the vessel 12 by suitable adhesive means 62 and 64. It will be understood, however, that in both the embodiment of FIGURE 1 and the embodiment of FIGURE 2, the cells may be disposed within the wall 18 itself, or, if desired, internally of the vessel 12.

The cells 58 and 60 are provided with heat vaporizable fluid 24 as hereinabove set forth, and communicate through conduits 66 and 68 respectively with a bellows 26a similar to the bellows 26, as through a conduit extension 66a. A suitable fitting 69 may be provided for this purpose. In accordance with the invention, the cells 58 and 60 are located on the wall 18 in predetermined vertically spaced relationship such that the lower cell 60 is in heat exchange relationship with the liquid 14 when the liquid is at the desired level 22, while the upper cell 58 is in a heat exchange relationship with the gas or vapor 32. Since the spacing of the cells 58 and 60 is calibrated in accordance with the desired level for the liquid in the vessel and since the liquid 14 has greater heat conductivity with respect to the cell 60 than the gas or vapor 32 has with respect to the cell 58, heat loss from the cell 60 will be correspondingly greater than with respect to the cell 58. Again, in order to maintain a heat differential between the cells and the interior of the vessel 12, means are provided which may include resistance elements 34a and 34b connected to a source of electrical energy 36a.

The bellows 26a forms part of a control unit 30a which is generally similar to the control unit 30, and includes a beam or lever 38a pivoted on a fulcrum 40a by expansion or contraction of the bellows 26a, as controlled by a spring 42a on a bracket 44a. A valve element 46a on the opposite end of the beam 38a tends to move upwardly in response to a decrease in the liquid level in the vessel 12, since heat loss from the cell 60 is diminished and gas pressure increased at such time. Pneumatic signal or control means 48a includes a conduit 50a leading to a source of air or other fluid under uniform pressure, and preferably having a restriction 52a prior to a nozzle outlet 54a controlled by the valve element 46a. An outlet conduit 56a is in register with the nozzle 54a to receive air or other fluid at a pressure determined by the position of the said valve element 46a and the bellows 26a. The outlet 56a has an extension 58 leading to a signal or control means (not shown) and as herein illustrated, feed back means may be provided in the embodiment of FIGURE 2, as well as in the embodiment of FIGURE 1, if desired, which include a conduit 60 leading to a chamber 62. The chamber 62 has a diaphragm 64 on which a control spring means or the like 66 is mounted to apply feed back control to the beam 38a. Thus when pressure is increased in the bellows 26a to raise the valve element 46a in response to a decrease in water level, as described, the pressure in the chamber 62 will diminish correspondingly and force will be applied to an extent which will limit the movement of the valve element 46a to a desired extent, to render the signalling action or control action more accurate.

Further to afford accuracy in signalling or control, the cells 58 and 60 may be constructed with a relatively large capacity so that a proportionately greater amount of time will be required to change the temperature therein to a significant extent. Thus splashing or other disturbances in the liquid will not create misleading signal or control effects.

Where exceptionally high temperatures are present in the vessel 12, as may be produced by steam or the like, the cells 58 and 60, as in the case of the cell 16, may be cooled by suitable refrigerant means in heat exchange relation thereto as previously described.

The corrective action may take the form of an increase in the head of pressure in the vessel 12, in the gas or vapor indicated by reference numeral 32, or it may take the form of an increase in the rate of liquid removal or a decrease in the rate of liquid supply, with respect to the liquid 14. It will also be understood that other control or signalling systems may be utilized in conjunction with the pressure system of the invention, whether pneumatic or otherwise, and as noted the units or cells 58 and 60 may be connected so that the instrument signal pressure may increase with decreasing level rather than decreasing, as in the embodiment of FIGURE 1. The pressure or signal function selected may depend upon whether the liquid supply rate, the head or gas pressure in the vessel or the liquid discharge rate is the independent variable.

The system of FIGURE 2 affords a relatively large range of liquid levels while permitting the use of standard units which may be placed advantageously with respect to obstructions on the wall of the vessel, if any. In fact, more than two cells may be utilized when wide liquid level limits are desired and the intermediate level is of small importance, as for example, when it is desired to show full or empty limits.

The cell means of the invention does not require any complicated support structure therefor and as previously indicated, may be used inside the vessel, or set in the wall of the vessel. Further, the device may be used with pressurized vessels, or vessels at atmospheric or sub-atmospheric pressures, and thus has application in a wide variety of situations where determination or control of liquid levels is called for.

Although I have herein set forth and described my invention with respect to certain specific principles and details thereof, it will be obvious to those skilled in the art that these may be varied without departing from the spirit and scope of the invention as set forth in the hereunto appended claims.

I claim as my invention:

1. A liquid level indicator for a vessel having an upwardly extending outer wall and adapted for containing varying quantities of liquid over a range of levels, comprising in combination,
    a closed cell means having an elongated heat transfer surface for bearing against the outer surface of said vessel wall to be in heat transfer relation therewith opposite the liquid within the vessel at locations extending over said range of levels,
    a fluid within said cell means having a characteristic pressure change within the cell means as a function of temperature change,
    a pressure sensor connected to said cell means,
    and means for supplying thermal energy at a constant rate to said fluid within said cell means with the rate of heat transfer between the fluid in the cell means and the vessel being manifested by change in pressure of said fluid so that the sensor will operate in accordance with the level of the liquid in the vessel within said range of levels.

2. A liquid level indicator in accordance with claim 1 wherein said cell means includes separate chambers each having a heat transfer surface for bearing against the vessel wall at vertically spaced locations over said range of level.

3. A liquid level indicator for a vessel having an upwardly extending outer wall and adapted for containing varying quantities of liquid over a range of levels, comprising in combination,
    a closed cell means having an elongated heat transfer surface for bearing against the outer surface of said vessel wall to be in heat transfer relation therewith opposite the liquid within the vessel at locations extending over said range of levels,
    a fluid within said cell means having a characteristic pressure change within the cell means as a function of temperature change,
    a pressure sensor connected to said cell means,
    and means for removing heat at a constant rate from said fluid within said cell means with the rate of heat transfer between the fluid and the cell means and the vessel being manifested by change in pressure of said fluid so that the sensor will operate in accordance with the level of the liquid in the vessel within said range of levels.

References Cited in the file of this patent

UNITED STATES PATENTS

| 20,847 | Grimes | July 6, 1858 |
|---|---|---|
| 1,833,112 | Harrison | Nov. 24, 1931 |
| 1,942,241 | Duhme | Jan. 2, 1934 |
| 2,274,254 | Newton | Feb. 24, 1942 |
| 2,651,317 | Heinz | Sept. 8, 1953 |
| 2,783,768 | Smoot | Mar. 5, 1957 |
| 2,849,185 | Keyes | Aug. 26, 1958 |
| 2,978,691 | Beher | Apr. 4, 1961 |
| 3,031,887 | Weisend | May 1, 1962 |

FOREIGN PATENTS

| 626,650 | Great Britain | July 19, 1949 |
|---|---|---|
| 130,943 | Sweden | Feb. 27, 1951 |